United States Patent Office 3,126,329
Patented Mar. 24, 1964

3,126,329
BLOWN BITUMENS AND A PROCESS
FOR MAKING THEM
Jean Fort, Paris, France, assignor to The British Petroleum Company Limited, London, England, a joint-stock corporation of Great Britain
No Drawing. Filed Apr. 25, 1961, Ser. No. 105,306
Claims priority, application France May 12, 1960
7 Claims. (Cl. 208—4)

A blown bitumen is the bitumen-like product obtained by blowing oxygen or a mixture of oxygen with inert gases, e.g. air, through a residual petroleum fraction in one or more stages. This invention relates to a catalyst for use in the preparation of blown bitumens and to the products obtained by its use.

Crude petroleum is usually separated into various factions by distillation, in one or more stages, at atmospheric pressure and the residue from the last of such distillations, hereinafter called an "atmospheric residue," is usually separated into more fractions by distillation under low pressure. The residue from this distillation is hereinafter called a "vacuum residue."

During the preparation of a blown bitumen the penetration of the feedstock is increased; therefore blown bitumens can be prepared from feedstocks having such low penetrations that the feedstocks cannot be regarded as bitumens. The residual petroleum fractions which may be used to prepare a blown bitumen are the vacuum and atmospheric residues defined above, mixtures of these and mixtures of these with the solvent extracts obtained during the preparation of lubricating oil.

A blown bitumen usually has a higher softening point than an unblown bitumen of the same penetration; that is the blown bitumens usually have higher penetration indices than the unblown bitumens. (The "penetration index" is defined as the slope of the curve showing the logarithm of the penetration plotted against the temperature in the temperature range between 25° C. and the softening point of the bitumen.)

Many catalysts have been proposed for use in the preparation of blown bitumens and in particular phosphorus pentoxide has been proposed. However the use of phosphorus pentoxide gives a product which contains insoluble polymers and this drawback limits the industrial use of phosphorus pentoxide as a catalyst for blowing bitumens.

According to the present invention a blown bitumen is produced by contacting a residual petroleum fraction with oxygen or a mixture of oxygen and inert gases, e.g. air, at a temperature of 150–300° C., and preferably 200–250° C., in the presence of a small quantity, e.g. 0.1–5% by weight based on the total feedstock, of a fluid catalyst which consists of an anhydrous solution of phosphorus pentoxide in a phosphoric acid having the general formula:

$$H_mR_nPO_4$$

where R represents an alkyl, cycloalkyl or aromatic radical having 1–20, preferably 1–5, carbon atoms, $m+n=3$ and $m=1$, 2, or 3. Preferably the oxygen or the mixture of oxygen and inert gas is blown through residual petroleum feedstock.

Conveniently the catalyst contains 50–80% by weight of phosphorus pentoxide based on the total catalyst and catalyst may be prepared by dissolving the phosphorous pentoxide consistant with a fluid catalyst solution. The catalyst may be prepared by dissolving the phosphorous pentoxide in the phosphoric acid at a temperature below 95° C. and raising the temperature to 130° C. to dissolve the phosphorous pentoxide after the evolution of water vapour ceases.

Preferred catalysts are anhydrous solutions of phosphorus pentoxide in orthophosphoric or methyl phosphoric acid. A particularly suitable catalyst is one containing 76% by weight of $P_2O_5$ dissolved in orthophosphoric acid; such a solution has a viscosity of 62.2° Engler at 20° C.

The invention also includes a blown bitumen that has been prepared by contacting a residual petroleum fraction with oxygen or a mixture of oxygen and inert gases, e.g. air, at a temperature of 150–300° C., and preferably 200–250° C., in the presence of a small quantity, e.g. 0.1–5% by weight based on the total feedstock of a fluid catalyst which consists of an anhydrous solution of phosphorus pentoxide in a phosphoric acid having the general formula:

$$H_mR_nPO_4$$

where R represents an alkyl, cycloalkyl or aromatic radical having 1–20, preferably 1–5, carbon atoms $m+n=3$, and $m=1$, 2, or 3 as described above.

Two examples of the preparation of a blown bitumen will now be described. The feedstocks used in these examples were:

*Feedstock A.*—This was a mixture of an atmospheric residue of a Kuwait crude (representing 52% of the original crude) and a vacuum residue (representing 21% of the original crude) of the same crude. It contained 70% atmospheric residue and 30% vacuum residue and had a viscosity of 101.6 cs. at 100° C.

*Feedstock B.*—This was a vacuum residue of a Kuwait crude which represented 22% of the original crude. Its viscosity was 1750 cs. at 100° C.

EXAMPLE I 20 metric tons of feedstock A were placed in a blowing tower and heater to 200° C. 134 kg. of catalyst were added and mixing assisted by gentle air injection. When mixing had been achieved the air injection was increased to 180 m.³/hour. The air flow and temperature were maintained constant for 6 hours.

The catalyst was a 75% solution of $P_2O_5$ in orthophosphoric acid.

The blown bitumen produced had the following inspection data:

Penetration at 25° C. _____ 209
Softening point _____° C___ 50
Kinematic viscoisty at 100° C. _____cs___ 7900
Penetration index _____ +3.9

The tower was emptied by pumps fitted with filters to prevent insoluble matter damaging the pumps. Little or no insoluble matter was found on the filters after the blown bitumen was removed from the blowing tower. No frothing was observed during the reaction.

This experiment was repeated using 100 kg. of phosphorus pentoxide as catalyst; after 10 hours' oxidation the blown bitumen had the following inspection data:

Penetration at 25° C. _____ 195
Softening point _____° C___ 43.2
Kinematic viscosity at 100° C. _____cs___ 2400
Penetration index _____ +0.4

When the tower was emptied the filters were clogged with insoluble matter.

EXAMPLE II 25 kg. of feedstock B were placed in a pilot plant and heated to 225° C. 2% by weight of catalyst was mixed with bitumen and air injection at the rate of 2030 litres/hour was started. A blown bitumen suitable for use in sealing work was produced.

The catalyst was an anhydrous solution consisting of 75% by weight of $P_2O_5$ in monomethyl phosphoric acid. No frothing was observed during the reaction and little or no insoluble matter was produced.

COMPARATIVE EXAMPLE

To provide comparative data, examples of the use of $P_2O_5$, orthophosphoric acid and an anhydrous solution of $P_2O_5$ in orthophosphoric acid will be given. In these examples 15 kg. samples of feedstock A were oxidised at $200\pm2°$ C. with an air blast of 135 litres/hours. The results are given in Table 1.

*Table 1*

| Catalyst Used | Percent Catalyst | Percent Insols. | Frothing |
|---|---|---|---|
| None | 0 | below 0.05 | None. |
| Phosphoric Acid | 1 | | Considerable. |
| Do | 2 | | Do. |
| $P_2O_5$ | 1 | 3.8 | None. |
| $P_2O_5$ | 2 | 7.5 | Do. |
| Solution | 1 | below 0.05 | Do. |
| Do | 2 | below 0.05 | Do. |

The catalyst solutions used in the above examples were prepared by adding 75 parts by weight of $P_2O_5$ to 25 parts by weight of the appropriate phosphoric acid keeping the temperature below 95° C. until the evolution of water vapour ceases; the temperature was then raised to 130° C. until all the $P_2O_5$ was dissolved.

Where the catalyst contains orthophosphoric acid, and in the comparative examples using orthophosphoric alone, the orthophosphoric used was one which contained 75% by weight of $H_3PO_4$.

The tests used to obtain the data given in the examples are described in "Standard Methods for Testing Petroleum and Its Products" under the following code numbers:

Penetration _____ IP 49/58
Softening point _____ IP 58/56

I claim:

1. A method of preparing a blown bitumen, in which an oxidising gas selected from the group consisting of oxygen and a mixture of oxygen and an inert gas, is blown through a residual petroleum fraction which is maintained at a temperature within the range 150° C. to 300° C. in the presence of a fluid catalyst consisting of an anhydrous solution of 50% to 80% by weight phosphorus pentoxide in 50% to 20% by weight of phosphoric acid having the general formula:

$$H_mR_nPO_4$$

in which R represents a monovalent hydrocarbon radical having 1 to 20 carbon atoms selected from the group of hydrocarbon radicals consisting of alkyl, cycloalkyl and aromatic radicals, and in which $m$ is 1 to 3 and $m+n=3$, said catalyst being present in an amount between about 0.1% and 5%, by weight, based on the total feedstock.

2. A method according to claim 1, in which the oxidising gas is air.

3. A method according to claim 1, in which the oxidation is conducted at a temperature within the range 200° C. to 250° C.

4. A method according to claim 1, in which the catalyst solution contains 70% to 80% by weight of phosphorus pentoxide and 30% to 20% by weight of the phosphoric acid.

5. A method according to claim 1, in which the radical R contains 1 to 5 carbon atoms.

6. A method according to claim 5, in which the phosphoric acid is orthophosphoric acid.

7. A method according to claim 5, in which the phosphoric acid is methyl phosphoric acid.

References Cited in the file of this patent

UNITED STATES PATENTS

| 1,201,601 | Melamid | Oct. 17, 1916 |
| 2,762,755 | Kinnaird | Sept. 11, 1956 |
| 2,859,167 | Van Wyk | Nov. 4, 1958 |

UNITED STATES PATENT OFFICE
CERTIFICATE OF CORRECTION

Patent No. 3,126,329            March 24, 1964

Jean Fort

It is hereby certified that error appears in the above numbered patent requiring correction and that the said Letters Patent should read as corrected below.

Column 1, line 65, for "catalyst may be prepared by dissolving the" read -- preferably it contains the greatest quantity of --; column 2, line 45, for "viscoisty" read -- viscisoty --.

Signed and sealed this 1st day of September 1964.

(SEAL)
Attest:

ERNEST W. SWIDER            EDWARD J. BRENNER
Attesting Officer            Commissioner of Patents